(12) United States Patent
Gaur et al.

(10) Patent No.: US 8,607,769 B2
(45) Date of Patent: Dec. 17, 2013

(54) COMBUSTION CONTROLLED NOX REDUCTION METHOD AND DEVICE

(76) Inventors: Siddhartha Gaur, Plano, TX (US);
Vibha Bansal, Plano, TX (US)

( * ) Notice: Subject to any disclaimer, the term of this patent is extended or adjusted under 35 U.S.C. 154(b) by 657 days.

(21) Appl. No.: 11/600,458

(22) Filed: Nov. 16, 2006

(65) Prior Publication Data
US 2008/0115773 A1    May 22, 2008

(51) Int. Cl.
*F02M 21/00*    (2006.01)

(52) U.S. Cl.
USPC ..................................... 123/585; 123/568.11

(58) Field of Classification Search
USPC ............... 123/585, 567, 568.11–568.15, 527, 123/528, 531, 532, 536, 435, 436, 698, 703, 123/588, 198 A, 575, 1 A, 3, DIG. 12, 217, 123/250–305, 26, 25 C, 25 E
See application file for complete search history.

(56) References Cited

U.S. PATENT DOCUMENTS

| | | | |
|---|---|---|---|
| 4,462,378 A | 7/1984 | Atago et al. | |
| 5,284,116 A | 2/1994 | Richeson, Jr. | |
| 5,400,746 A | 3/1995 | Susa et al. | |
| 5,467,750 A | 11/1995 | Braun et al. | |
| 5,593,480 A | 1/1997 | Poschl | |
| 5,636,619 A | 6/1997 | Poola et al. | |
| 5,649,517 A | 7/1997 | Poola et al. | |
| 5,783,160 A | 7/1998 | Kinugasa et al. | |
| 5,896,840 A | 4/1999 | Takahashi | |
| 5,954,023 A | 9/1999 | Mizuno et al. | |
| 5,960,777 A | 10/1999 | Nemser et al. | |
| 6,055,808 A * | 5/2000 | Poola et al. | 60/274 |
| 6,067,973 A * | 5/2000 | Chanda et al. | 123/585 |
| 6,157,885 A | 12/2000 | Sakaguchi et al. | |
| 6,170,264 B1 | 1/2001 | Viteri et al. | |
| 6,289,884 B1 | 9/2001 | Blandino et al. | |
| 6,453,893 B1 | 9/2002 | Coleman et al. | |
| 6,481,394 B1 | 11/2002 | Hiki | |
| 6,543,428 B1 | 4/2003 | Blandino et al. | |
| 6,598,398 B2 | 7/2003 | Viteri et al. | |
| 6,604,497 B2 | 8/2003 | Buehrle, II et al. | |
| 6,609,493 B2 | 8/2003 | Yamaguchi et al. | |
| 6,654,677 B2 | 11/2003 | Weber et al. | |
| 6,701,906 B2 | 3/2004 | Kim | |
| 6,722,352 B2 | 4/2004 | Smolarek et al. | |
| 6,742,507 B2 | 6/2004 | Keefer et al. | |

(Continued)

FOREIGN PATENT DOCUMENTS

WO   WO-94/15698    7/1994
WO   WO-99/42709    8/1999

(Continued)

OTHER PUBLICATIONS

James A. Miller et al., Chemical Kinetics and Combustion Modeling, Annu. Rev. Phys. Chem. 1990 41:345-387.

*Primary Examiner* — Rinaldi Rada
*Assistant Examiner* — Hung Q Nguyen
(74) *Attorney, Agent, or Firm* — Osha • Liang LLP; John W. Montgomery

(57) ABSTRACT

In this invention, there is provided a method for reducing NOx emission from an internal combustion engine designed to produce a given amount of power and a method for improving fuel efficiency by providing an intake stream of oxygen-enriched air and keeping the amount of power output the same so that the combustion temperature in the engine is lower.

3 Claims, 11 Drawing Sheets

(56) References Cited

U.S. PATENT DOCUMENTS

| | | |
|---|---|---|
| 6,773,256 B2 | 8/2004 | Joshi et al. |
| 6,813,550 B2 | 11/2004 | Minami |
| 6,875,009 B2 | 4/2005 | Kayahara et al. |
| 7,047,741 B2 * | 5/2006 | Gray, Jr. ............ 60/603 |
| 2003/0015185 A1 | 1/2003 | Dutart |
| 2004/0003592 A1 | 1/2004 | Viteri et al. |
| 2005/0081800 A1 | 4/2005 | Davidson |
| 2005/0199231 A1 * | 9/2005 | Heider .................. 123/585 |

FOREIGN PATENT DOCUMENTS

| | | |
|---|---|---|
| WO | WO-99/67508 | 12/1999 |
| WO | WO-00/15951 | 3/2000 |
| WO | WO-02/42628 | 5/2002 |

* cited by examiner

COMBUSTION CONTROLLED NOX REDUCTION METHOD AND DEVICE

BACKGROUND OF INVENTION

1. Field of the Invention

This invention relates generally to methods for reducing NOx emissions from a combustion engine and apparatuses thereof.

2. Background Art $NO_x$ (also commonly written as NOx or NOX) is the generic name for a group of highly reactive gases that contain varying amounts of nitrogen oxides including, but not limited to, $NO$, $NO_2$, $NO_3$, $N_2O$, $N_2O_3$, $N_2O_4$, $N_3O_4$, and mixtures thereof. They are typically colorless and odorless but react readily with ammonia, moisture and other compounds to form nitric acid and related particles. $NO_x$ and their related chemical products have been identified as major air pollutants and are the causes for serious health and environmental concerns in the U.S. and other industrialized nations around the world. Some of the heath and environmental problems related to $NO_x$ include ground level ozone (smog) formed when $NO_x$ and volatile organic compounds (VOC) react in heat and sunlight, acid rains formed when $NO_x$ and sulfur oxide react with other substances in the air to form acids, and deep-penetrating particles that can exacerbate human respiratory diseases such as emphysema and bronchitis. According to some estimates, common sources of $NO_x$ are motor vehicles (49%), electric utilities (27%), and other industrial, commercial and residential sources (19%) that burn hydrocarbon fuels.

Among the common sources of $NO_x$, motor vehicles have perhaps received the most attention. Since 1970, the U.S. Environmental Protection Agency (EPA) has required motor vehicle manufacturers to reduce $NO_x$ emissions. Although significant reductions have been achieved through auto emissions controls, increasing public awareness of environmental issues has led to ever more stringent regulatory requirements. On Dec. 21, 2000, the EPA signed emissions standards for model year 2007 and later heavy-duty highway engines to limit the emission level to about 0.20 g/bhp-hr, a ten-fold reduction from the 2004 level. In light of the great public interest in reducing $NO_x$ emissions, there is an urgent need for improved means to reduce $NO_x$ emissions. Therefore, there is a need for a device, system or method for reducing $NO_x$ emissions in combustion engines and for reducing $NO_x$ emissions from other $NO_x$ producing devices as well.

To address the problem of $NO_x$ emissions, an understanding of how $NO_x$ is formed may be helpful. During combustion of fossil fuels (mainly hydrocarbons) $NO_x$ is formed via several mechanisms: thermal $NO_x$, fuel $NO_x$, and prompt $NO_x$. Thermal $NO_x$ results from the reaction between nitrogen in the air and excess oxygen at elevated temperatures. Fuel $NO_x$ results when nitrogen is oxidized by combustion air. Prompt $NO_x$ is caused by the intermediate formation of hydrogen cyanide (HCN) followed by the oxidation of HCN to nitric oxide (NO).

Fuel $NO_x$ and prompt $NO_x$ are typically not of major concern. Fuel $NO_x$ is not produced in significant amounts from burning of hydrocarbon fuels, which have little or no chemically bound nitrogen. Moreover, the nitrogen content of fuels can be reduced during the production of the fuel using known techniques. Prompt $NO_x$ is only significant in very fuel-rich flames and is produced by high-speed reactions in the flame front. Fuel rich flames are not prevalent in internal combustion engines. These two types of $NO_x$ will herein be collectively referred to as chemical $NO_x$.

The formation of thermal $NO_x$ from a typical combustion reaction converting fossil fuel into energy is a complex chemical phenomenon involving about 1000 chemical reactions with about 100 distinct chemical species. Understanding this complex network of interacting reactions can be a daunting task and detailed theoretical modeling and prediction of combustion remain difficult (for an overview, see Chemical Kinetics and Combustion Modeling. J A Miller, R J Kee, C K Westbrook Annual Review of Physical Chemistry, October 1990, Vol. 41, Pages 345-387). However, some of the essential mechanisms of thermal $NO_x$ formation (this is sometimes referred to as the Zel'dovich mechanism) may be generally understood. A generalized description of the process is set forth below.

At high temperatures, both nitrogen ($N_2$) and oxygen ($O_2$) are dissociated into atoms that react by the Zel'dovich mechanism:

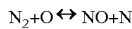

$N_2 + O \leftrightarrow NO + N$

$N + O_2 \leftrightarrow NO + O$

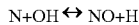

$N + OH \leftrightarrow NO + H$

In this process, NO is the principal reaction product. Once nitrogen and oxygen molecules are dissociated into atoms, the indicated three reactions form a chain reaction process that can self-propagate for many cycles, each adding to the amount of NO produced. The major factors that affect thermal $NO_x$ production are combustion temperature, residence time at temperature, the degree of fuel/air mixing, and the concentrations of oxygen and nitrogen in the air that is burned. Higher temperature, longer residence time, enhanced mixing, and higher oxygen concentration all favor $NO_x$ formation.

As mentioned earlier, in addition to transportation related pollution, it is known that industrial, commercial, and residential burners such as those used in electric utilities, in commercial factories, and in residential home heaters can also contribute to the increasing global concentration of $NO_x$. For purposes of this discussion, we will limit our focus primarily to $NO_x$ emissions resulting from transportation industries and particularly motor vehicle combustion engines including, but not limited to, gasoline and diesel engines.

In FIG. 1, a schematic diagram of a typical combustion engine 10 is shown. The engine 10 receives oxidant 12 for the combustion reaction (usually atmospheric air) and fuel 14 through the reactant intake 16. The fuel and oxidant may be fed individually for mixing in the cylinder or may mix in the reactant intake 16. Once the reactants are inside the combustion chamber 18 of the engine 10, the reactants (air-fuel mixture 20) are ignited, as for example, with a spark plug 22 during the compression stroke of the engine 10. The combustion results in the release of heat energy and expansion of gases that increases the pressure inside the combustion chamber 18. After the combustion reaction, the products of the reaction 24 are released from the chamber 18 through engine exhaust passage 26, typically into the atmosphere 30. The reaction products 24, sometimes referred to as exhaust gases, may contain unburned or partially burned hydrocarbons and also $NO_x$, both of which contribute to pollution when they are exhausted into the atmosphere 30. In some cases, the exhaust passage 26 may comprise one or more devices to reduce the $NO_x$ that is discharged into the atmosphere. For example, there may be a scrubber 32 and/or a catalytic converter 34 included along or at the outlet of the exhaust passage 18. Devices such as scrubber 32 and catalytic converter 34 are designed to extract $NO_x$ from the exhaust gas stream 20 after the $NO_x$ has already been formed. Such devices can be complicated, difficult to install on internal combustion engines, and are often expensive. Typically, such devices are only partially effective to extract the $NO_x$. Unburned hydrocarbon may also be found in the exhaust stream and different means are required for removing hydrocarbon compared to the means required for removing $NO_x$.

Prior to the present invention, much of the research on reduction of emissions from combustion engines has been primarily focused on either completing combustion of all components of the fuel sources or on implementing post-combustion clean-up technologies. Complete combustion typically focuses on burning the fuel at high temperatures and burning the fuel with high oxidant content so that all the components of the hydrocarbon fuels are fully oxidized. The use of excess oxidants to ensure complete combustion is sometimes referred to as lean fuel/air ratio burning (less fuel than stoichiometricly balanced fuel combustion would require for the available oxygen in the air). The same situation is sometimes referred to as rich air/fuel combustion (more air than is required to combine completely with the available fuel). Both expressions represent the same situation where the amount of oxidants required for complete combustion is greater that the amount of fuel present. This is sometimes expressed with an inequality expression as "oxidant>fuel". Some combustion modification technologies have been aimed at modifying the complex combustion chemistry such as by injecting additives into the fuel-mix to lower the production of $NO_x$ while maintaining complete combustion. One approach to reducing pollution has been to provide an enriched oxygen air stream into an internal combustion engine to accomplish complete combustion. While increased oxygen content in the air fuel mixture can decrease the unburned hydrocarbon pollution in the exhaust, it has been found that the increased oxidants often also increases the production of $NO_x$.

It has also been common to consider post-combustion clean-up technologies that are aimed at extracting $NO_x$ from the engine exhaust using devices such as scrubbers and catalytic converters. Maintaining both complete combustion of the fuel and reduced $NO_x$ are often competing goals. In prior devices, complete hydrocarbon combustion and engine efficiency often meant that the $NO_x$ formation was increased and scrubbers and/or catalytic converters were relied upon to reduce $NO_x$ emissions. Moreover, when using scrubbers and catalytic converters it has often been necessary to periodically replace the expensive scrubbers and converters to ensure $NO_x$ extraction efficiency and to provide different sizes, numbers, or types of scrubbers or converters to upgrade the system to keep-up with the latest government mandated low emission requirements.

SUMMARY OF INVENTION

According to one embodiment of the invention, the inventors have discovered a novel approach to reducing $NO_x$ emissions by precisely controlling the ratio of $N_2$ to $O_2$ in the intake air of an internal combustion engine to maintain existing engine efficiency and to achieve a level of $NO_x$ reduction as might be mandated by governmental agencies, such as the EPA, without requiring expensive upgrades to existing scrubbers and converters.

According to one embodiment of the present invention, there is provided a method for reducing $NO_x$ emission from a combustion engine by feeding an oxygen-enriched air stream comprising a desired proportion of oxygen and nitrogen into the intake of an existing internal combustion engine to maintain conversion of fuel to energy that is equivalent to the designed fuel to energy conversion of the engine while operating at a lowered combustion temperature and reducing the level of $NO_x$ formation due to the lowered combustion temperature.

According to one embodiment of the present invention, there is also provided a combustion engine comprising an apparatus capable of providing an intake air stream having a desired oxygen/nitrogen ratio for an internal combustion engine. One skilled in the art will recognize workable embodiments of the apparatus to include, but not limited to, a compressor for providing compressed oxygen to enhance the oxygen concentration of the intake air, a molecular membrane for separating $O_2$ and $N_2$ in the air stream so that an enhanced $O_2$ stream is provided to the engine intake, a gas separation membrane, a molecular sieve, a filter capable of filtering out oxygen or nitrogen, a gas absorption separator, a pressure swing separator and multiples of the foregoing devices for in-creasing the concentration of oxygen and any combination thereof.

Other aspects and advantages of the invention will be apparent from the following description and the appended claims.

DETAILED DESCRIPTION

Figure 1:
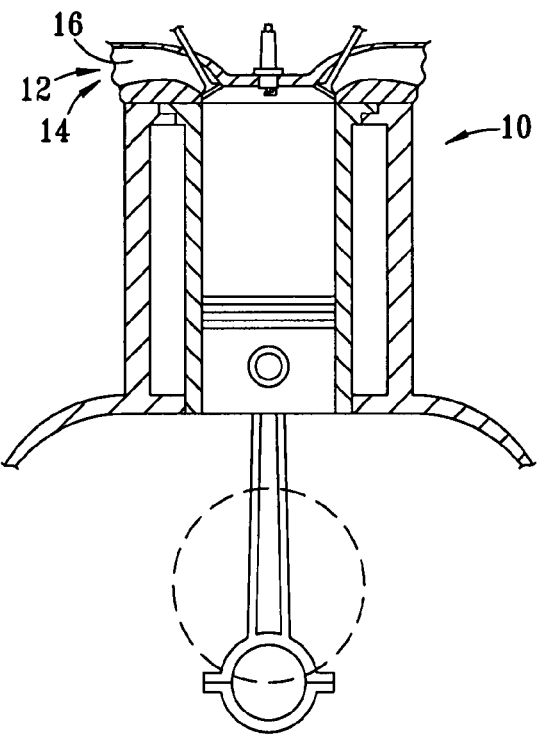
FIG. 1 is a schematic representation of a typical combustion engine.

The present invention is primarily concerned with the reduction of thermal $NO_x$ in combustion engines. As such, the following discussion will be focused on preventing or reducing thermal $NO_x$ formation in a typical combustion reaction used to power combustion engines. Although other undesirable pollutants such as sulfur oxides ($SO_x$) may also be produced in a given internal combustion engine, such other pollutants are not the focus of the useful method and device disclosed and will not be included in this discussion.

In a combustion reaction of hydrocarbon fossil fuels, all chemical bonds in the hydrocarbon ($C_xH_y$) are broken, oxidized, and recombined at a sufficiently high temperature within a reasonably short time period. For some commercially available fuels, temperatures above about 900° C. may be sufficient and for almost any commercially available hydrocarbon fuels temperature above 950° C. will be sufficient to break all chemical bonds to permit oxidation of the hydrocarbon. However, given the multitude of chemical reaction pathways available, a range of reaction products are usually produced. To approach theoretical combustion or stoichiometric combustion (the ideal combustion process in which all the carbon (C) is oxidized to $CO_2$, all the hydrogen (H) to $H_2O$, and all the sulfur (S) to $SO_2$) one may provide $O_2$ in excess of the stoichiometrically balanced amount.

A typical generalized chemical equation representing the burning of fossil fuels is as shown below in equation (i):

$$C_xH_yN_{z1}O_{z2}S_{z3} + ER_{HT}(O_2N_2) \rightarrow a(CO_2) + b(H_2O) + c(C_vH_w) + [d(SO_{x2}) + e(NO_x) + f(O_2) + g(N_2)] \quad \text{(i)}$$

where, $$ER_{HT} > 1.0 \quad \text{(ii)}$$

($ER_{HT}$ is the equivalent ratio of oxidant:fuel for the high temperature burning);

where,

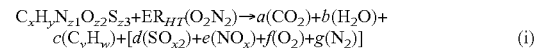

$$v, w, z1, z2, z3 << x, y; \quad \text{(iii)}$$

where, a, b, c, d, e, f, and g are coefficients determined by the values of v, w, x, y, and z such that the chemical equation is balanced; and where, $$NO_x = e(\text{fuel } NO_x) + e2(\text{thermal } NO_x) \quad \text{(iv)}$$

It will be recognized that $CO_2$, $H_2O$, $O_2$ and $N_2$ are all "good" environmentally safe resultant components that may be exhausted into the atmosphere generally without being deemed to be harmful to the ecological environment. Any amount of remaining hydrocarbon $C_vH_w$ that is exhausted as emissions is deemed undesirable or "bad". However, in a typical oxygen rich and fuel lean burning environment where $ER_{TH} > 1.0$ and where the combustion temperature is sufficiently high, it is expected that there will be little if any unburned hydrocarbon and thus the coefficient "e" in equation (iv) will be considered to be equal to 0, or at most will be very small. The $SO_x$ and $NO_x$ (regardless of whether it is fuel $SO_x$ and/or $NO_x$ or thermal $SO_x$ and/or $NO_x$) are all potentially "bad" components deemed to be harmful to the ecological environment.

Those skilled in the art will recognize from this disclosure that in general, the amount of time required for complete combustion is in reverse proportion to combustion temperature and amounts of oxidants, i.e., the higher the combustion temperature, the shorter the complete combustion time, and, likewise, the higher the amount of available oxidants, the shorter the complete combustion time.

The rate of combustion might be generally represented as the change in fuel concentration during burning as follows:

$$\Delta C_A / \Delta t = K X_A X_B \quad (v)$$

Where $\Delta C_A$ is the change in fuel concentration,
$X_A$ is the concentration of the fuel for the reaction,
$X_B$ is the concentration of the oxidant for the reaction, and
K is the conversion rate given by the equation:

$$K = A e^{-E/RT} \quad (vi)$$

Where A is a constant known as the frequency factor,
E is a constant known as the activation energy,
R is the gas constant, and T is the temperature of the reaction.

Thus it can be considered that the rate of converting fuel to energy may be predicted by the equation:

$$\Delta C_A / \Delta t = A e^{-E/RT} X_A X_B \quad (vii)$$

It is considered that the power (P) of an engine having a given design is proportional to the rate of conversion of fuel, namely P is proportional to $\Delta C_A / \Delta t$. In the equation for the rate of fuel conversion it is also considered that as RT becomes larger, the expression $-E/RT$ becomes a smaller negative number and the expression $A e^{-E/RT}$ becomes larger. Also it will be seen that a larger concentration of oxidant $X_B$ also correlates to a larger value of the expression $A e^{-E/RT} X_A X_B$. Hence, an increase in the rate of conversion of fuel correlates to either an increase in the temperature or an increase in the concentration of oxidants. It is noted that the effect of temperature on the rate of conversion is an exponential relationship such that the conversion to $NO_x$ increases exponentially relative to increases in the temperature. The effect of oxidant concentration on the rate of conversion is generally a linear relationship. The equation bears out common experience that when other factors are the same, a higher temperature T will correlate to a faster rate of fuel conversion and greater power. Consider for example, the following common observations to facilitate understanding of the principles and effects calculable by equation (vii) as explained above. Thus, for example at one high temperature condition, a sufficiently high temperatures can result in almost instant conversion of fuel as in a flash over or an explosion. In another example, at a low temperature condition, a sufficiently low temperature (within the range of combustion temperatures for a fuel/air mixture) will require a long time to burn the fuel. Also, when other factors are the same, higher concentrations of oxidants will allow a faster rate of conversion, such as for example a burning reaction in pure oxygen is observed to be very rapid. These examples are given for understanding some basic principals and are not intended to be quantitative for purposes of the disclosure.

Based upon this understanding, it can also be understood that for the same power output, an increase in the concentration of the oxidant $X_B$ can be offset by an appropriate decrease in the temperature T. The decrease in temperature T decreases the value of RT and therefore increases the absolute value of the expression E/RT. In the equation (vii) this results in a larger negative value for the exponent, $-E/RT$. A larger negative value of an exponent decreases the value of the expression $A e^{-E/RT}$. Thus, if the concentration of the oxidant, $X_B$, is increased, the same rate of fuel conversion $\Delta CA/\Delta t$ is maintained at a lower temperature, T. The power output of an engine is determined by the rate at which the engine converts the chemical energy of the fuel to mechanical energy. Thus, it has been found by the inventors that by increasing the oxidant concentration, $X_B$, the same power output (proportional to the fuel conversion rate, $\Delta CA/\Delta t$), can be maintained from a given engine at a lower reaction temperature, T. This assumes that the same mechanical efficiencies of the engine are obtained at lower operating temperatures, and this is considered to be a good assumption for most engines, as it is for most mechanical devices.

As the inventors have pointed out above, a reduction in the combustion temperature, T, also causes a reduction in $NO_X$ formation. The same amount of fuel is converted to exhaust products in the same amount of time so that a slower rate of $NO_X$ formation also means that the total $NO_X$ formation will be reduced over time. Also, because the rate of $NO_X$ formation is exponentially related to the combustion temperature, T, at higher combustion temperature ranges it is found that small reductions in temperature represent large reductions in $NO_X$ formation. The present invention recognizes that this relationship can be used to a significant advantage for the reduction of $NO_x$ produced substantially by any given engine design. According to a useful embodiment of the invention, an engine designed to burn fuel in air and to operate at a particular temperature to produce a particular output power can be modified to operate at the same power output, and at a lower temperature by increasing the proportion of oxygen present in the air.

In a typical air aspirated hydrocarbon fuel burning engine, such as a gasoline fuel burning internal combustion engine, a diesel fuel internal combustion engine, or a natural gas internal combustion engine, the combustion temperature is around 1000° C.-1100° C. This temperature is generally considered to be sufficient to break the chemical bonds of nitrogen and oxygen and to initiate the Zel'dovich mechanism of combustion.

Figure 2:
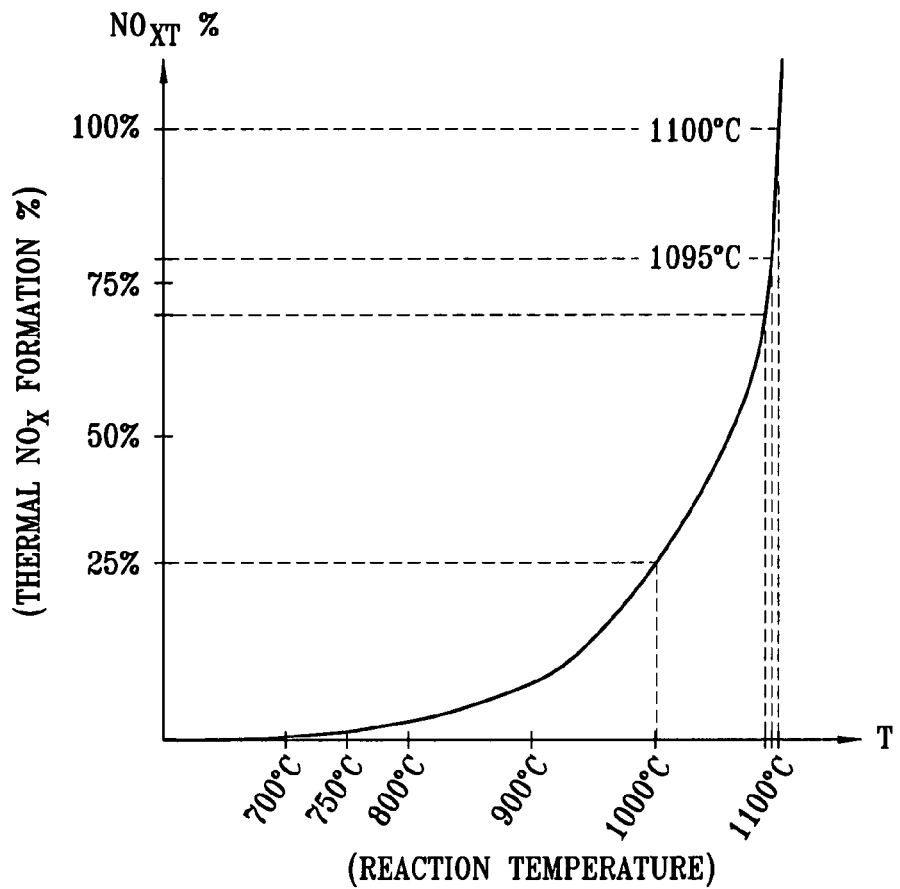
FIG. 2 is a graphical representation of a generalized relationship showing the percentage of total theoretically possible $NO_x$ formation rate as a function of combustion temperature.

FIG. 2 shows a representative graph for a hydrocarbon fuel combusted in air of the percentage of $NO_x$ formation relative to the total possible $NO_X$ formation that would be possible based upon the available $O_2$ as a function of combustion temperature. This is analogous to the rate of formation as a function of combustion temperature. When the combustion temperature is below about 700° C., the formation rate of $NO_x$ is at a minimum. Once the combustion temperature rises above the threshold of $NO_X$ formation temperature at about 700° C. for this fuel, the formation rate of $NO_x$ begins to increase rapidly. In this example, representation of a hydrocarbon fuel, such as natural gas, gasoline, or diesel fuel, at temperatures between about 1000° C.-1100° C., the formation of $NO_x$ hits a steep portion of an exponentially increasing curve. At combustion temperatures close to 1100° C., nearly 100% of the possible $NO_x$ formation is considered as being achieved, and at temperatures at or above about 1100° C., 100% of the possible $NO_X$ is deemed to be achieved.

Figure 3:
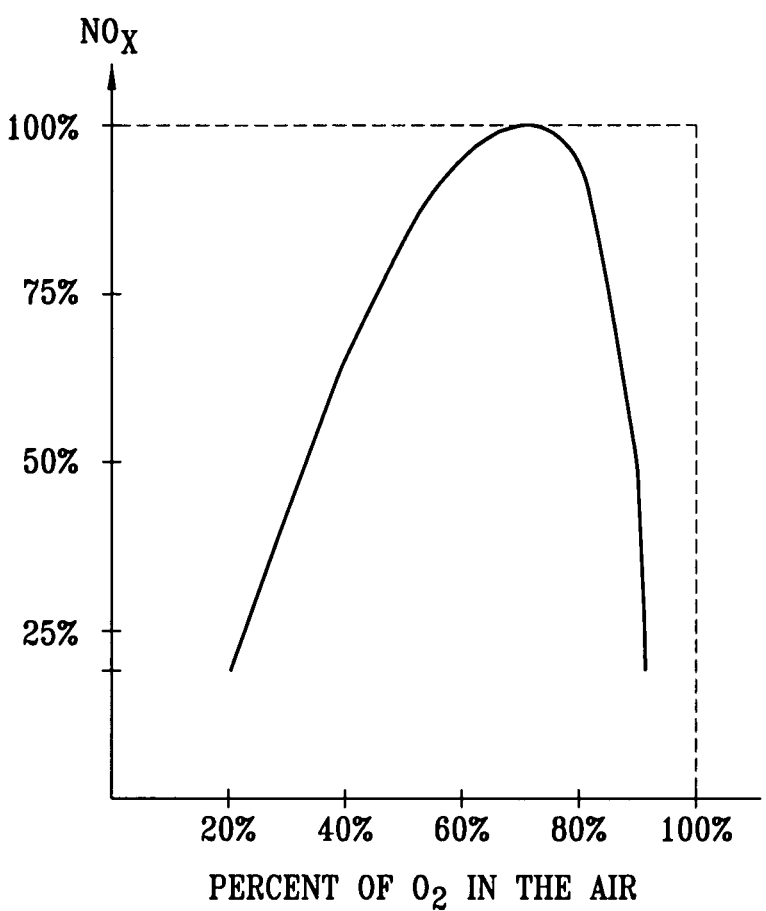
FIG. 3 is a graphical representation of a generalized relationship showing the percentage of total theoretically possible $NO_x$ formation rate as a function of available oxidant (oxygen, $O_2$).

FIG. 3 shows a generalized graph of $NO_x$ formation rate as a function of available oxidants (in this example the oxidant availability is in terms of concentration of oxygen or $O_2$ in the air). It can be seen that at both low oxygen availability and high oxygen availability (indicating that there would be a depletion of $N_2$), formation of $NO_x$ is less than its maximum potential. However, it can also be seen that there is an intermediate range of available oxygen for which $NO_x$ formation is at a maximum. Thus, solely for the purposes of reducing $NO_x$, it is desirable to keep combustion temperatures below 1000° C., preferably below 700° C. and to keep the oxygen supply either at a high availability level or at a low availability level.

Understandably, the primary purpose of an internal combustion engine is not to reduce $NO_x$ formation; rather it is to convert chemical energy into mechanical energy by completely burning the fuel in the air. Other considerations are also taken into account, such as the consideration that burning hydrocarbon fuels generally requires operating temperatures above about 900° C. for efficient burning. Likewise, keeping the available oxygen too low can result in starving the combustion reaction of required oxidants, and keeping oxygen availability in high excess is often not practical when operating an engine. Particularly, internal combustion engines that are designed for operation on Earth benefit from using the currently abundant air supply. Since naturally occurring air on Earth is composed of about 79% nitrogen and only about 21% oxygen, using air as the supply of oxidants for a combustion engine normally establishes the concentration of oxidants. Supplying a steady stream of oxygen in great excess of stoichiometric proportion is therefore generally expensive or generally requires a significant amount of energy input to produce a very high concentration of oxygen. Previously it was not generally believed to be practical or possible to reduce $NO_x$ formation in a combustion engine by enriching oxygen in the intake air. This is because it was commonly believed that oxygen in great excess of stoichiometric amounts was required in order to achieve significant reduction of $N_2$.

Figure 4:
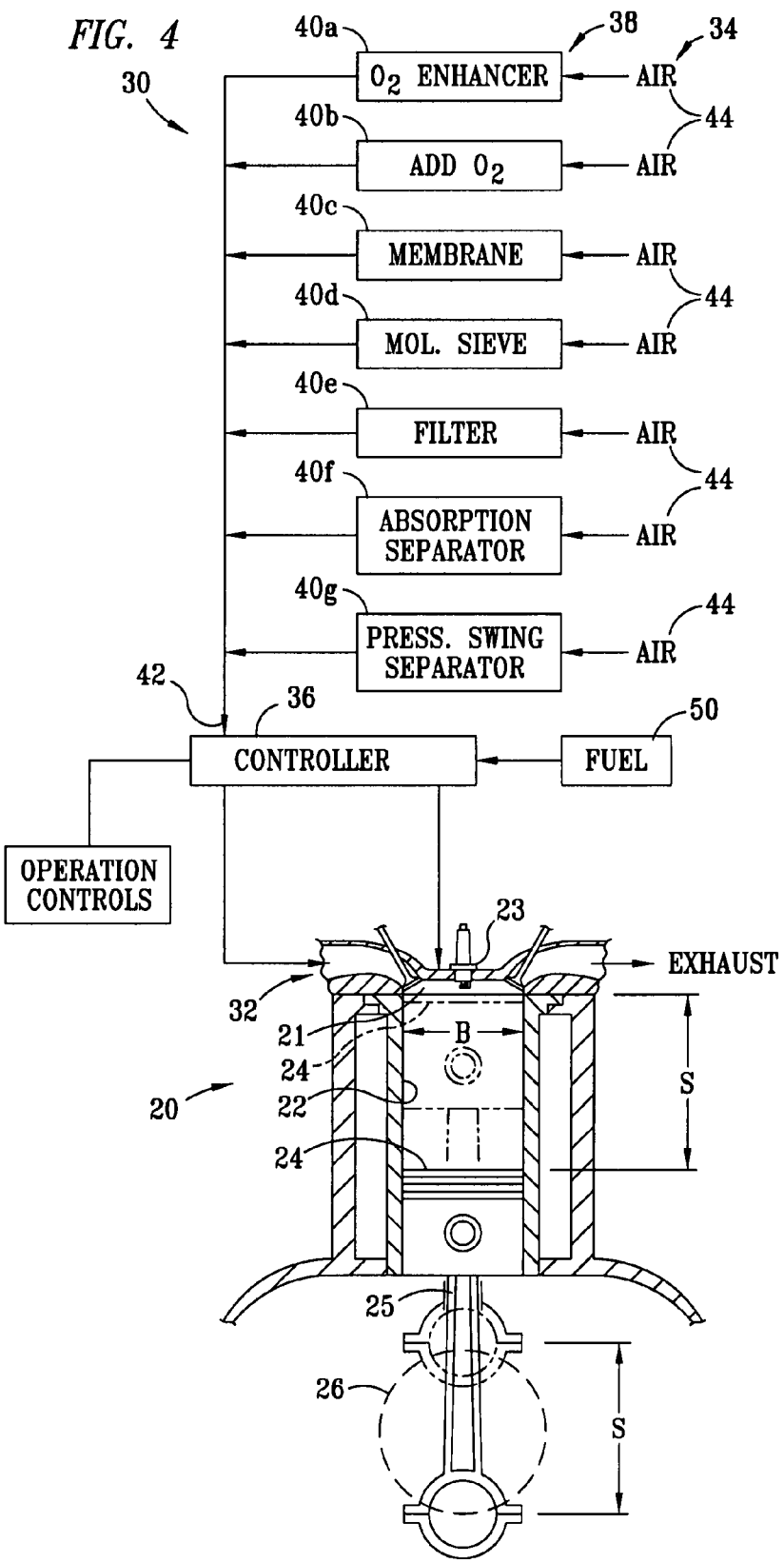
FIG. 4 is a schematic representation of a combustion engine with a plurality of alternative oxygen enhancers for feeding the fuel an-d air to the engine for combustion.

Referring to FIG. 4 it will be understood that when a fuel is burned inside the combustion chamber of an engine 20, the fuel is converted into high temperature product gases. The volume occupied by the gases increases and/or the pressure inside the engine combustion chamber increases when the fuel burns. Generally, it will be understood by those skilled in the art that the mechanism for converting the chemical energy of the fuel into mechanical energy is by using the increase in combustion chamber 21 pressure applied within the cylinder 22 and between the closed cylinder head 23 and the movable piston 24. The increased volume and pressure of the burning gases "pushes" the piston 24 and this allows the engine to capture the chemical energy in the form of piston movement to accommodate the increased pressure and volume of the gases. The lineal motion of the piston is translated through a connecting rod 25 to rotary motion 26 at a power output crank shaft (not shown). The time period over which the burning occurs to cause the piston to move down one stroke length S of the cylinder determines the conversion rate of the fuel. The time period is determined by the rotation speed of the engine or the revolutions per minute (RPM) at which the engine operates. When designing an engine, the designer or engineers use the displacement volume of the piston moving in the cylinder, as determined by the bore diameter B and the stroke length S, and the time for burning, as determined by the operating RPM, to provide a desired or acceptable operating temperature. To maximize the power for a given size engine, the combustion temperature is generally desired to be as high as possible within acceptable ranges of the materials and cooling capability of the cylinder and piston. If an engine is designed to withstand a higher temperature and to rotate at a higher speed it will generally produce more power. In the past, much effort was directed to increasing the rate of combustion in order to increase the power. This has generally resulted in higher operating temperatures. The temperatures may be increased as the materials and cooling system capabilities are improved.

Figure 5:
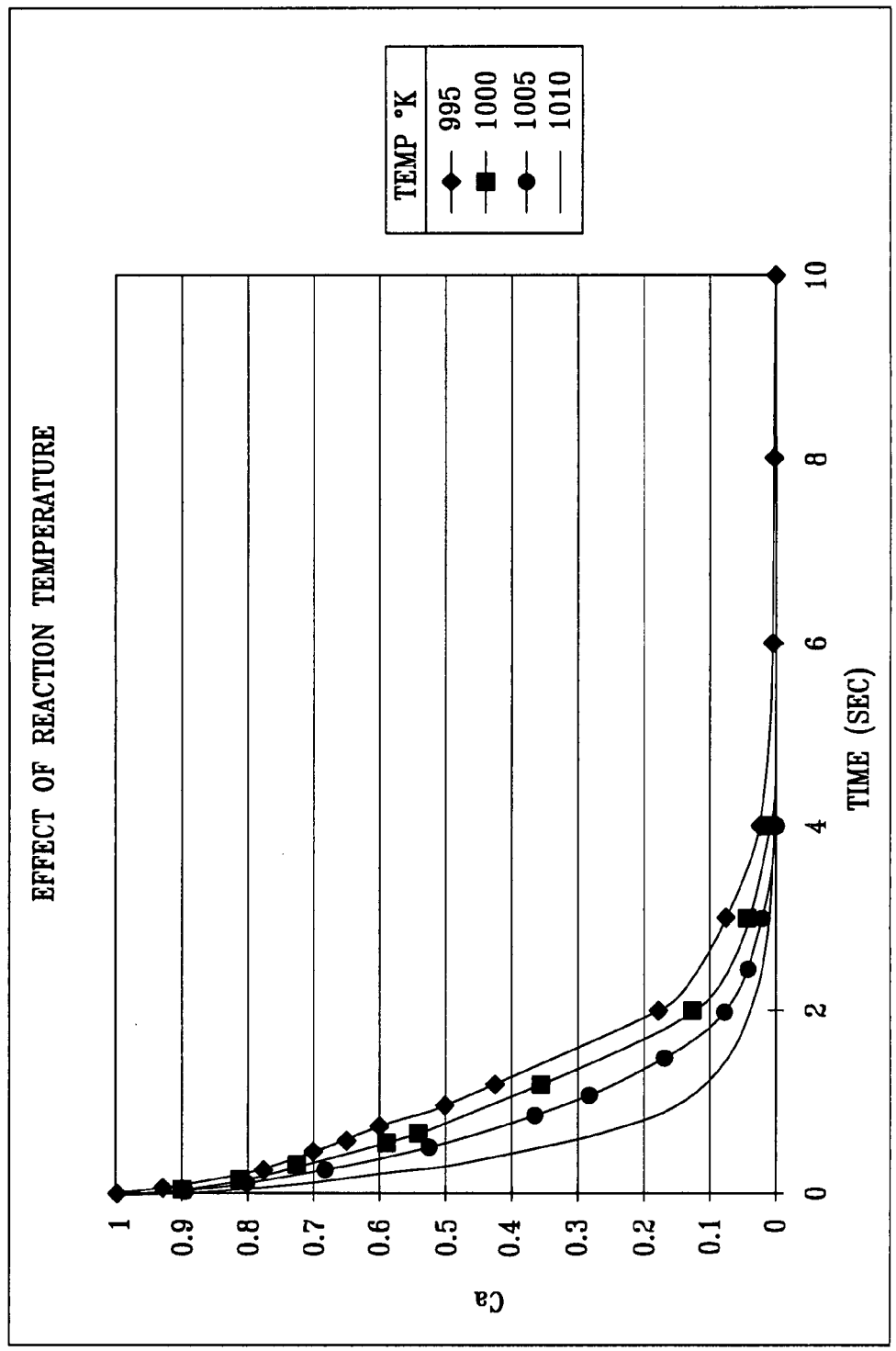
FIG. 5 is a graph representing a theoretical relationship between temperatures (° K) at which burning takes place by plotting the percent of carbon fuel remaining to be reacted, namely the concentration of the reactants (Ca), versus the time of the reaction at four different constant temperatures as indicated in the legend.

A factor that must also be considered is the efficiency of the engine. FIG. 5 shows a graph of fuel conversion rate Ca as a function of time under constant temperature conditions. Each of the curves represent the conversion rate of fuel using atmospheric air as the source of oxidant and at the constant temperatures of 995° K, 1000° K, 1005° K, and 1010° K for each line as indicated in the legend. The power of the engine is closely related to the rate of fuel conversion.

It will be understood that the faster the combusting gases expand (namely the faster the fuel conversion occurs), the greater the rate of increase in pressure with-in the cylinder between the combustion chamber and the piston. Increased pressure results in faster piston movement and greater power output from the engine. It is also true that the same engine operating at a slower fuel conversion rate would ordinarily result in producing less power from that same engine. It has been discovered by the inventors that generally internal combustion engines are designed to produce a particular output power and the designed output power is related to and basically establishes the combustion temperature for any given engine design. The inventors have found that the operating temperature has a significant effect on the $NO_x$ formation. However, to run an engine at a temperature that is lower than the designed combustion temperature would result in inefficient fuel energy conversion and less than the designed output power for the engine. This analysis assumes that in either instance of high or low temperature engine operation, the amount of fuel to be burned has within it the same chemical energy and a stoichiometric amount of air is supplied to the engine for complete combustion (or for the same degree of completeness of combustion).

One way to operate an engine at a slower fuel conversion rate is to provide less fuel to be converted during a specified period of time. However, that would result in less available chemical energy. Another way to provide a slower conversion rate is to operate at a lower temperature. This aspect of engine operation is further illustrated in FIG. 5 where theoretical fuel conversion percentage Ca is plotted as a function of time for different constant temperature conditions, as indicated by the legend.

Figure 6:
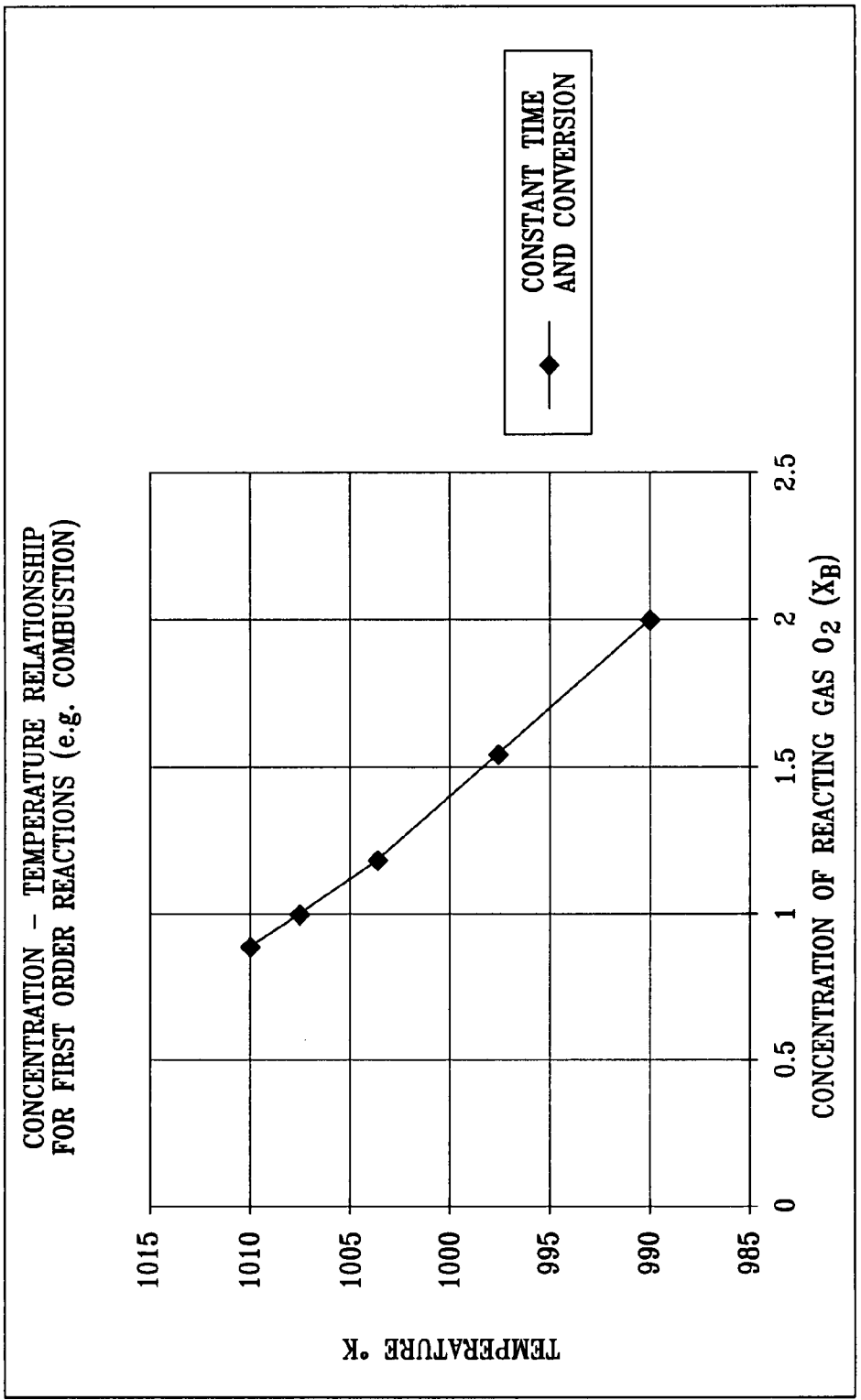
FIG. 6 is a graph representing a theoretical relationship between temperature (° K) at which burning takes place versus concentration of oxygen in the reacting gas ($X_B$) that will maintain a constant time and constant rate of conversion. The starting concentration of $O_2$ for a constant time and conversion (completion of the reaction of all the fuel) is indicated, ranging from 1.0 or a standard amount of $O_2$ in air to 2.0 indicating double the amount of $O_2$ in air. This indicates that higher temperatures are required to complete the conversion when there is a smaller percentage of $O_2$, and lower temperature can obtain complete combustion when there is a larger percentage of $O_2$.

It has been found by the inventors that a lower temperature of a reaction may also be obtained by increasing the concentration of oxidants in the air without increasing the power output. This might be demonstrated in FIG. 6, plotting the effect of increasing the concentration of oxygen in air from the normal 21% $O_2$, at $X_B$, =1 up to 42% $O_2$, at $X_B$=2. The reaction temperatures in this theoretical example decreases from 1010° K for 21% $O_2$ down to 990° K for 42% $O_2$ to obtain the same reaction completion within the same time. From this figure, it can be understood that an engine operating under lower than normal oxygen intake conditions would require a higher temperature to reach 100% fuel conversion, whereas the same engine operating under an enriched oxygen intake condition would require a lower temperature to achieve 100% fuel conversion in the same amount of time.

According to one embodiment of the present invention, there is provided a method for reducing $NO_x$ emissions from a combustion engine by feeding an oxygen-enriched air stream into the intake of an existing internal combustion engine, wherein the enriched air stream comprises a desired proportion of oxygen and nitrogen such that the oxygen concentration is higher than the normal oxygen concentration for which the engine was designed. For a given engine design output power, the combustion temperature is lowered from the designed operating temperature and the same output power is produced because the fuel conversion rate is maintained by correspondingly increasing the concentration of oxygen. A lower temperature results due to the increased rate of fuel conversion provided by the increased availability of oxidants. Thus, because the combustion temperature is lower than the designed combustion temperature for the designed output power, the level of $NO_x$ formation is also reduced. It will be noted that this is contrary to the results of others where it was determined that the $NO_x$ formation was increased by the increased oxidant concentration to increase the power.

In one embodiment, the desired proportion of oxygen/nitrogen depends on the type of fuel, the reduced amount of $NO_x$ desired, and the relative costs associated with increasing the oxidant concentration above the concentration normally found in atmospheric air. One example of a useful ratio of oxygen/nitrogen is about 5% enrichment of oxygen content, or modified intake air comprising about 25% oxygen and 75% nitrogen. According to one aspect of the invention, it has been found by the inventors that enrichment of oxidants in the intake air stream has a greater effect on $NO_x$ reducing the amount of $NO_x$ formation than would be expected based only upon the reduction of the amount of nitrogen. It might have been considered impractical to supply a stream of oxygen in sufficient excess of the stoichiometric amount to enjoy the beneficial $NO_x$ rate reduction effect as shown in FIG. 3 due only to the effect of less nitrogen available for forming $NO_x$. There would need to be almost complete elimination of $N_2$ from the intake stream (i.e., nearly pure oxygen) in order to observe a significant reduction of thermal NOx. However, the inventors have discovered that it is not necessary to supply oxygen in great excess of the stoichiometric amount. In this present invention, the inventors have found that the combined effect of lower temperature and higher oxygen content can yield a significant reduction in $NO_x$ emissions. For example, using the diagram of FIG. 2, it might be understood that by employing 5% oxygen-enriched air, the combustion reaction is shifted to require a lower combustion temperature to achieve the same fuel conversion rate. It is noted that the fuel conversion rate is responsible for the power output. Thus, by maintaining the same power output while increasing the oxidant concentration, the temperature of combustion should be reduced. Pointing to FIG. 2, one can see that for hydrocarbon fuel combustion a normal engine design operating temperature in a range of 1000° C.-1100° C. brackets a steep region of the $NO_x$ formation curve. For some examples, lowering the operating temperature from 1100° C. to 1000° C. might correspond to reducing the rate of $NO_x$ formation by as much as about 70%, lowering the operating temperature from 1100° C. to 1090° C. might correspond to reducing the rate of $NO_x$ formation by as much as about 30%, lowering the operating temperature from 1100° C. to 1095° C. might correspond to reducing the rate of $NO_x$ formation by as much about 20%. Simply put, this indicates that for an existing engine design, a slight change in combustion temperature to a lower operating temperature can result in a significant reduction in the indicated $NO_x$ formation rate. This is potentially significant where governmental mandated reductions of $NO_x$ in emissions by only 5% have in the past been difficult to achieve.

The following Table A shows relative amounts of $NO_x$ formation from a modeled combustion process showing burning natural gas at four different fuel/oxygen concentration levels and at three different temperatures for each different concentration. The amount of $NO_x$ is indicated as approximately the amount of NO formed because for the process modeled, the quantity of NO formed was two orders of magnitude larger than the next largest quantity of $NO_x$ formed or at least about 100 times as much as quantity of the next largest type of $NO_x$ (among the common types of NO, $NO_2$, and $N_2O$) formed in the modeled process.

TABLE A

Theoretically Modeled Representation of $NO_x$ Formation

| $C_A$ | N2/O2 | Burning Temperature ° C. | $NO_x$ Formation lb/Hr-lb of fuel (in terms of NO formation only) | Estimated NOx formation measured in lbs/hour for each ton of fuel processed |
| --- | --- | --- | --- | --- |
| $C_A$ = 1.0 (approx. 79% $N_2$/21% $O_2$ standard air) | $N_2$ = 16/$O_2$ = 4 | 1064° C. | 5.35 × 10$^{-4}$ | 1.07 lbs/hr |
| $C_A$ = 1.0 | $N_2$ = 16/$O_2$ = 4 | 850° C. | 1.15 × 10$^{-4}$ | 0.23 lbs/hr |
| $C_A$ = 1.0 | $N_2$ = 16/$O_2$ = 4 | 650° C. | 1.46 × 10$^{-5}$ | 0.029 lbs/hr |
| $C_A$ = 1.2 (approx. 75% $N_2$/25% O2 standard air) | $N_2$ = 12/O2 = 4 | 1064° C. | 4.63 × 10$^{-4}$ | 0.93 lbs/hr |
| $C_A$ = 1.2 | $N_2$ = 12/O2 = 4 | 850° C. | 1.00 × 10$^{-4}$ | 0.20 lbs/hr |
| $C_A$ = 1.2 | $N_2$ = 12/O2 = 4 | 650° C. | 1.27 × 10$^{-5}$ | 0.025 lbs/hr |
| $C_A$ = 1.5 (approx. 70% N2/30% O2 standard air) | $N_2$ = 9.33/O2 = 4 | 1064° C. | 3.90 × 10$^{-4}$ | 0.78 lbs/hr |
| $C_A$ = 1.5 | $N_2$ = 9.33/O2 = 4 | 850° C. | 8.78 × 10$^{-5}$ | 0.18 lbs/hr |
| $C_A$ = 1.5 | $N_2$ = 9.33/O2 = 4 | 650° C. | 1.06 × 10$^{-5}$ | 0.021 lbs/hr |
| $C_A$ = 2.5 (approx. 50% N2/50% O2 standard air) | $N_2$ = 4/O2 = 4 | 1064° C. | 2.69 × 10$^{-4}$ | 0.54 lbs/hr |
| $C_A$ = 2.5 | $N_2$ = 4/O2 = 4 | 850° C. | 8.78 × 10$^{-5}$ | 0.12 lbs/hr |
| $C_A$ = 2.5 | $N_2$ = 4/O2 = 4 | 650° C. | 5.78 × 10$^{-5}$ | 0.015 lbs/hr |

In certain prior internal combustion engines, attempts to obtain greater output power or greater efficiency, by increasing the concentration of input oxygen, had the effect of increasing the $NO_x$ formation. The inventors have discovered that by attempting to obtain greater output power that is greater than the designed output power (i.e. by increasing the rate of fuel conversion, rather than keeping that rate the same) combustion temperature was also increased. As a result, the $NO_x$ formation rate increased as well. Thus, by maintaining the output power to be the same, while increasing the oxidant concentration, the temperature is reduced and the $NO_x$ formation is correspondingly reduced as indicated by the graph of FIG. 2.

According to one embodiment of the present invention, there is also provided a method for improving fuel efficiency of a combustion engine. In a typical combustion engine, most of the energy released from burning the fuel is dissipated as heat. By using 5% enriched oxygen and operating the engine at a lower combustion temperature, not only is the rate of $NO_x$ formation reduced, the rate of energy wasted due to high temperature heat losses should also be reduced. Thus, less fuel will be required to obtain the same useful power output generated by burning the fuel at a lower temperature. The amount of fuel burned can therefore be reduced while maintaining the same useful power output of the engine.

According to one embodiment of the present invention, an oxygen enhancement apparatus provides a stream of oxygen-enriched air to a combustion engine. A schematic of such an oxygen enhancement apparatus 30 is shown in FIG. 4. The apparatus comprises a first end 32, a second end 34, and a middle portion 36. The first end is capable of being adapted to connect to the intake of a combustion engine 20. The second end is comprised of an interface 38 exposed to an air source. The middle portion is adapted to form a passage 36 connecting the first 32 and the second 34 ends. The apparatus typically operates by drawing air from the second end 34, passing the air through the middle portion 36, and then feeding the air to a combustion engine 20 via the first end 32. In a situation where the air source comprises compressed air, the middle portion 36 may simply serve as a regulating element, controlling the amount of air flow. In a situation where the air source comprises atmospheric air, the middle portion may further comprise one or more oxygen-enriching elements that might be generally referred to as an $O_2$ enhancer 40a. In one embodiment, an oxygen enriching element might include an $O_2$ adder, such as a compressed $O_2$ source. In other embodiments, the oxygen enhancers may be selected from a group including, but not limited to, a molecular membrane 40c or gas separation membrane 40c, a molecular sieve 40d, a filter system 40e capable of filtering oxygen or nitrogen out of the air, adsorption materials or adsorption devices 40f, a pressure swing separator 40g, and any combination of one or more of these or other devices for enhancing oxygen content or oxygen concentration in the air.

According to one embodiment of the present invention, a combustion engine 20 may comprise an in-place enriched air stream apparatus 30 capable of providing an air stream having a desired oxygen/nitrogen ratio to an intake 22 of a combustion engine 20. One skilled in the art, based upon the disclosure herein, will recognize the usefulness of adapting an apparatus 30 capable of enriching oxygen content in the air and that will fit onto and interfaces with a combustion engine 20, to provide oxygen-enriched air 40 for combustion with the fuel 50 for which the engine 20 is designed. Usefully, the in-place enriched air stream apparatus 30 comprises an apparatus that is efficient at enriching or otherwise enhancing the oxygen content of the air 40 by about 1% to 20% over the ambient air 42. Examples of such an apparatus may include, but are not limited to, one or more apparatuses selected from a group of a compressed $O_2$ carrier 40b, a molecular membrane 40c, a gas separation membrane 40c, a molecular sieve 40d, a system of one or more filters 40e capable of filtering out oxygen or nitrogen, adsorption materials 40f or devices 40f, pressure swing devices 40g, other $O_2$ enhancers 40a and any combinations thereof.

EXAMPLES

The following are graphical representations, similar to the tabular representation in Table A above, showing computer modeled example calculations based upon specified input of a hydrocarbon fuel. (For purposes of the model, natural gas was used as the fuel. It will be understood that similar representations and relationships may be shown for other hydrocarbon fuels such as diesel and gasoline fuels.)

Specifically, FIG. 5 is a graph representing a theoretical relationship between time of reaction versus concentration of oxygen in the reacting gas ($X_B$) for four different reaction temperatures at which burning takes place, including 995° K, 1000° K, 1005° K, and 1010° K. Again, it will be observed that the modeled time for reaction is decreased at every concentration of $O_2$ by increasing the temperature of the reaction.

This relationship is maintained for the entire range of conversion percentages (note that Ca=0.1 corresponds to 90% completion of fuel conversion Ca.

FIG. 6 is a graph representing a theoretical relationship between temperatures (° K) at which burning takes place versus concentration of oxygen $X_B$ in the reacting gas that will maintain a constant time and constant rate of conversion.

Figure 7:
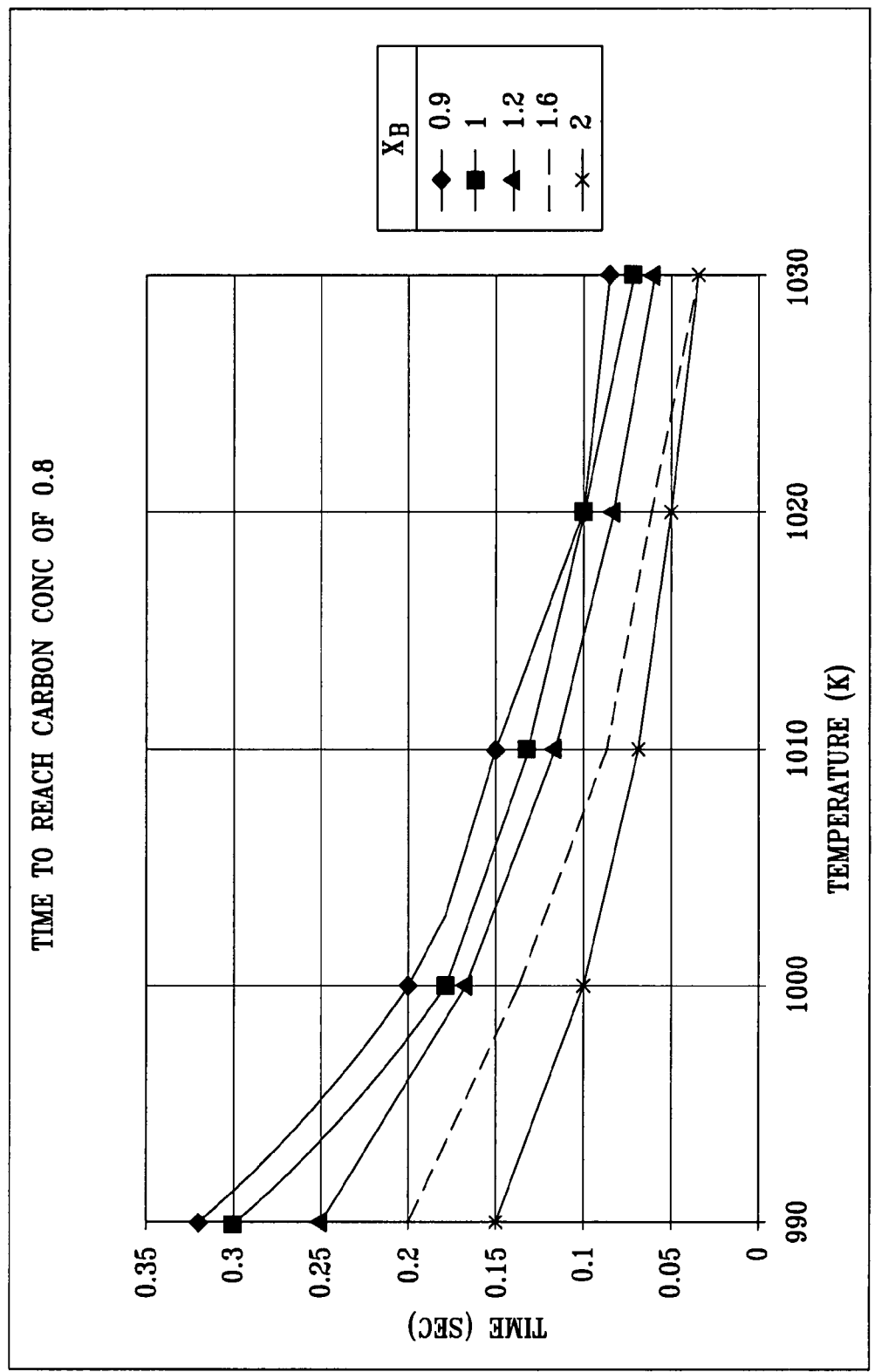
FIG. 7 is a graph representing a theoretical relationship between temperature (° K) and time for reacting 20% of the fuel (i.e., the time and temperature for a combustion reaction to take place and to reach 0.8 concentration of carbon (Ca) plotted for each of 5 concentrations of oxygen in air ($X_B$) ranging from 90% (18% $O_2$ and 82% $N_2$), normal concentration or 100% (21% $O_2$ and 79% $N_2$), 120% (25% $O_2$ and 75% $N_2$), 160% (33% $O_2$ and 67% $N_2$), and 200% (42% $O_2$ and 58% $N_2$) as indicated in the legend.

FIG. 7 is a graph representing a theoretical relationship between temperature (° K) and time for reacting 20% of the fuel (i.e., the time and temperature for a combustion reaction to reach 0.8 concentration of carbon at each of 5 concentrations of oxygen $X_B$ takes place versus concentration ($X_B$) of oxygen in air. The modeled results are plotted for each of five different starting concentrations ($X_B$) of $O_2$ in air, namely starting concentration ($X_B$) of oxygen in air where the smallest concentration $X_B$ is 90% of normal concentration and the largest concentration Ca is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend. It will be observed that over the range of temperatures modeled, the time of reaction decreased with increased reaction temperature. Also, the time was higher for lower concentrations of $O_2$ at every temperature. In only one instance, at about 1020° K, the time for converting using 0.9 concentration of $O_2$ approached the same time for converting using 1.0 concentration of $O_2$. Nevertheless, the relationship, for all concentrations of oxygen greater than standard concentration of oxygen in the air, clearly demonstrated that the time for completing combustion to a desired degree, is shorter for higher concentrations of $O_2$.

Figure 8:
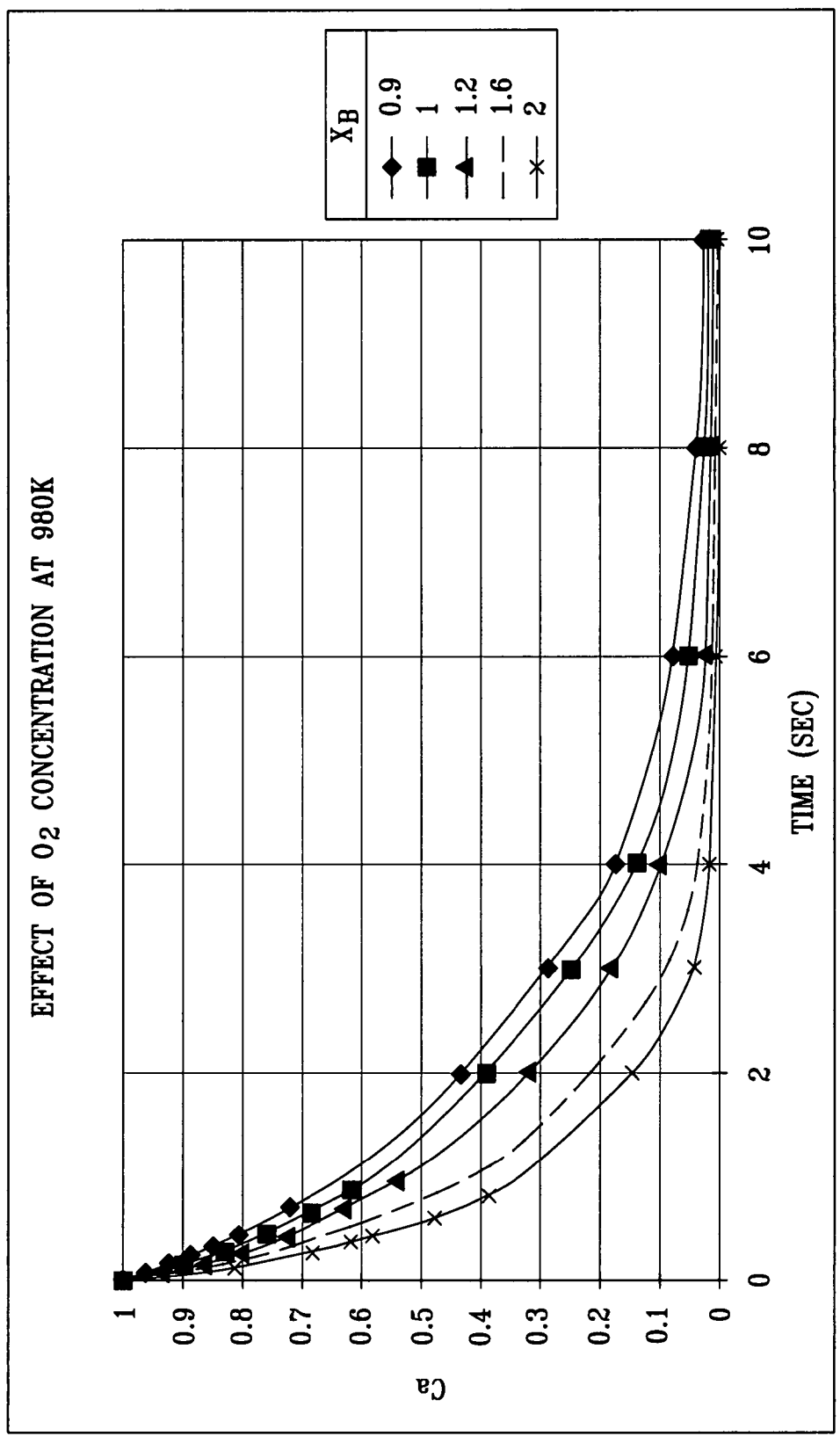
FIG. 8 is a graph of a modeled reaction at a constant temperature of 980° K and showing the time for reacting all the reactants of the fuel in terms of carbon concentration Ca of a reacting gas. The modeled results are plotted for each of five different starting concentrations ($X_B$) of $O_2$ in air. The time to react to an indicated percent of remaining reactant concentration (Ca) is plotted for five concentrations ($X_B$) of oxygen in air, as indicated in the legend where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79% N2), 120% ($O_2$=25% and $N_2$=75%), 160% ($O_2$=33% and $N_2$=67% N2), and 200% ($O_2$=42% and $N_2$=58%) as indicated in the legend.
Figure 9:
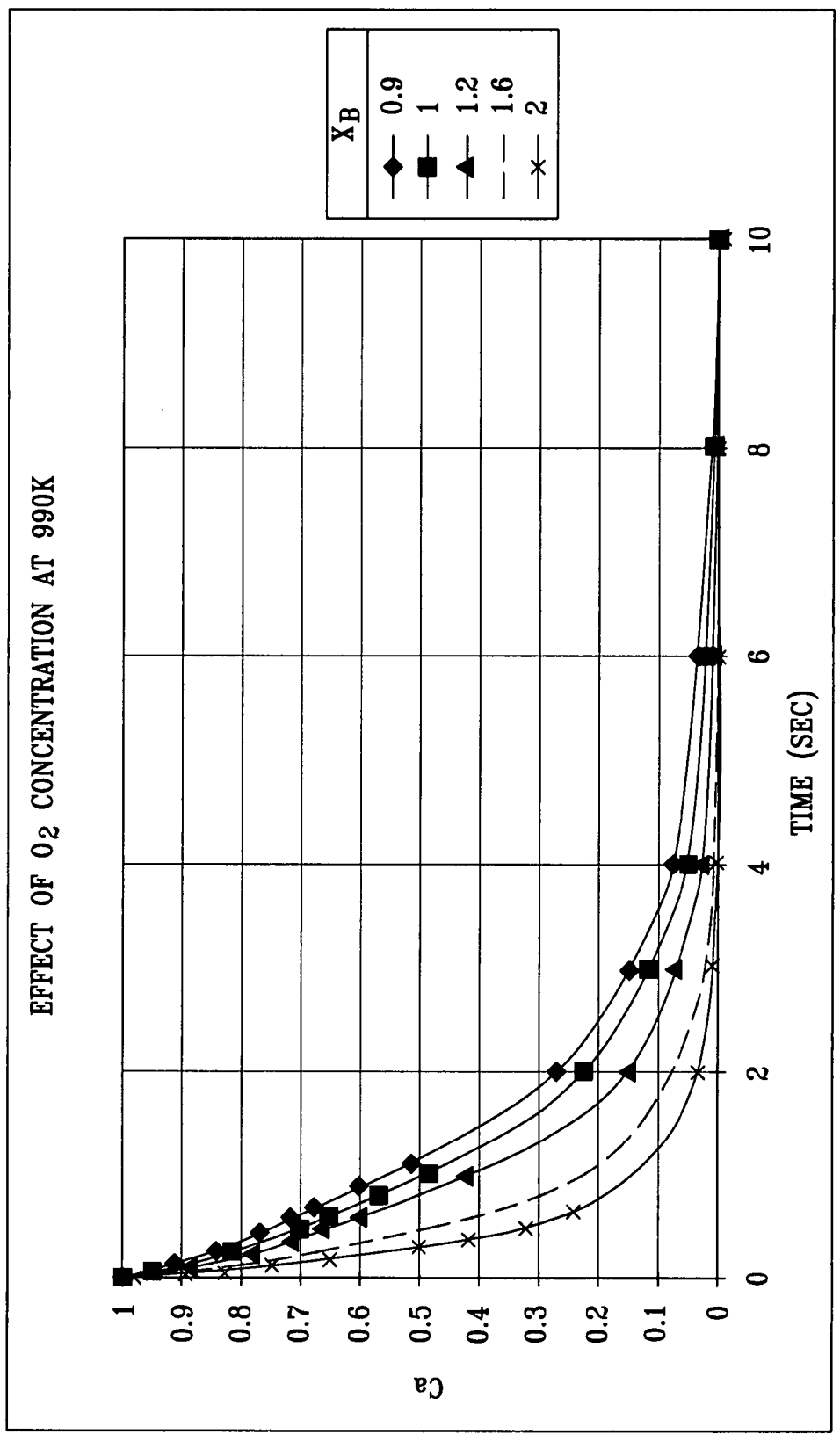
FIG. 9 is a graph of a modeled reaction at a constant temperature of 990° K and showing the time for reacting all the reactants of the fuel in terms of concentration Ca of a reacting gas. The modeled results are plotted for each of five different starting concentrations ($X_B$) of $O_2$ in air. The time to react to an indicated percent of remaining reactant concentration (Ca) is plotted for five concentrations ($X_B$) of oxygen in air, as indicated in the legend where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79% N2), 120% ($O_2$=25% and $N_2$=75%), 160% ($O_2$=33% and $N_2$=67% N2), and 200% ($O_2$=42% and $N_2$=58%) as indicated in the legend.
Figure 10:
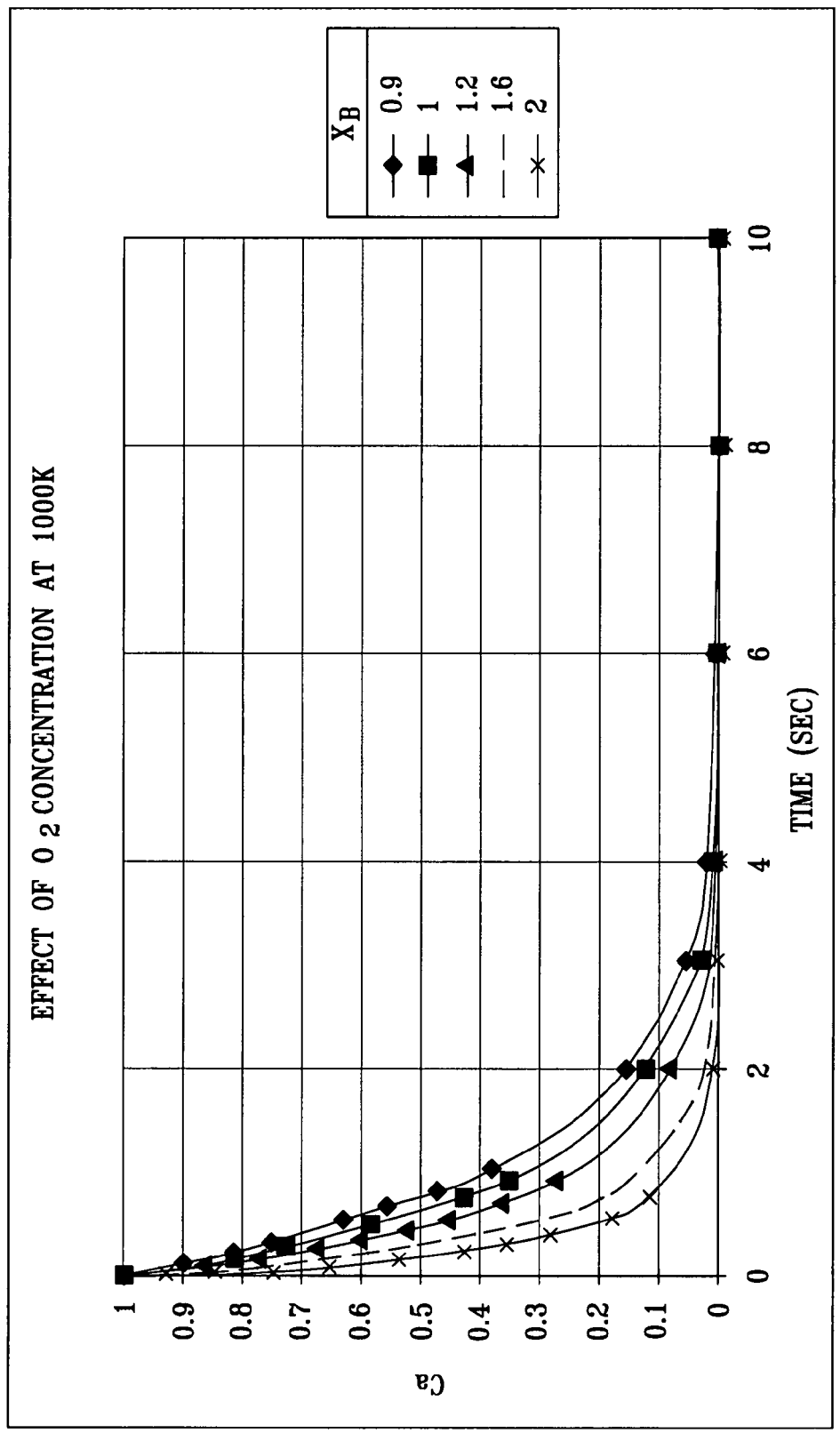
FIG. 10 is a graph of a modeled reaction at a constant temperature of 1000° K and showing the time for reacting all the reactants of the fuel in terms of concentration Ca of a reacting gas. The modeled results are plotted for each of five different starting concentrations ($X_B$) of $O_2$ in air. The time to react to an indicated percent of remaining reactant concentration (Ca) is plotted for five concentrations ($X_B$) of oxygen in air, as indicated in the legend where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79% N2), 120% ($O_2$=25% and $N_2$=75%), 160% ($O_2$=33% and $N_2$=67% N2), and 200% ($O_2$=42% and $N_2$=58%) as indicated in the legend.
Figure 11:
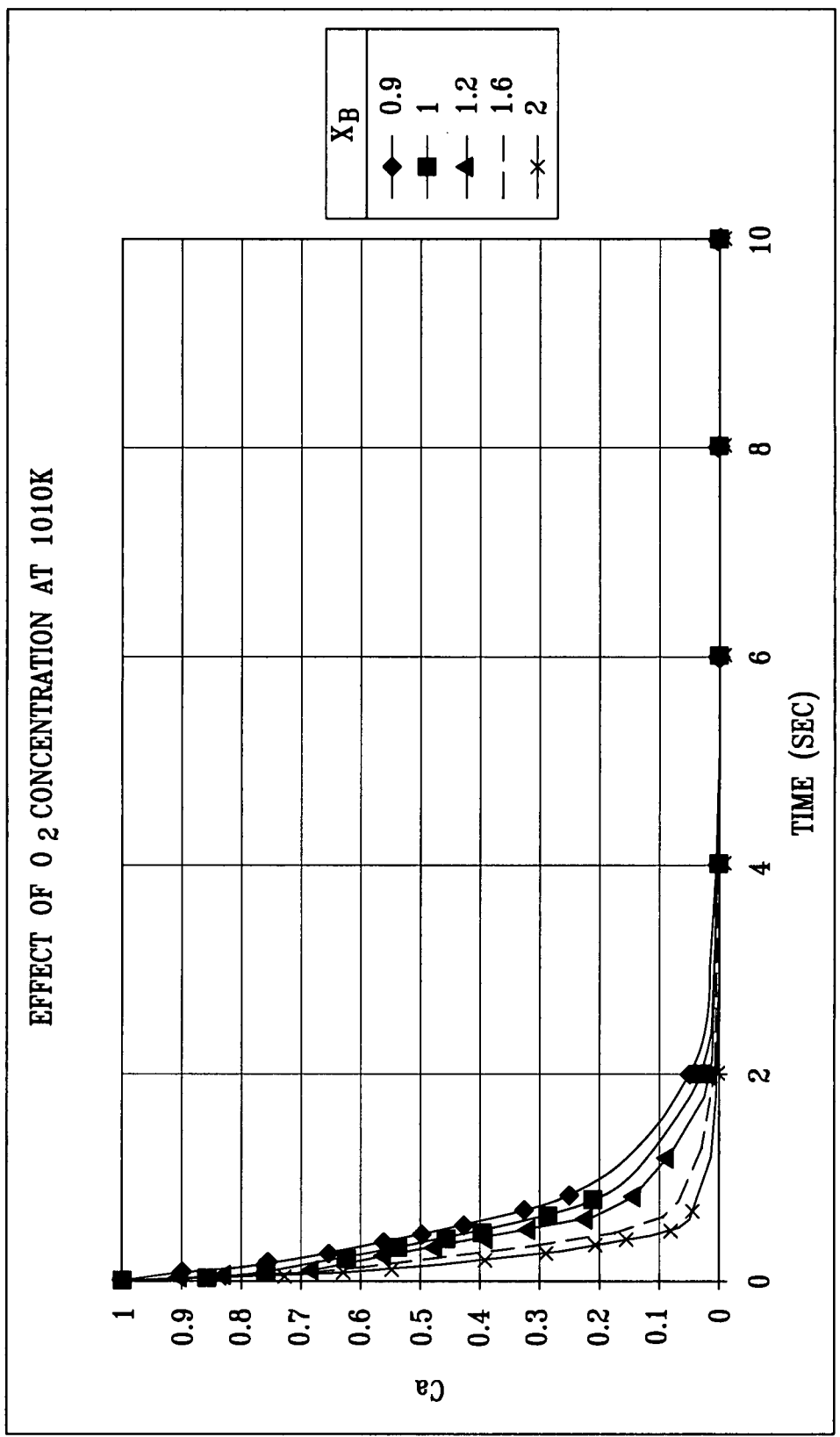
FIG. 11 is a graph of a modeled reaction at a constant temperature of 1010° K and showing the time for reacting all the reactants of the fuel in terms of concentration Ca of a reacting gas. The modeled results are plotted for each of five different starting concentrations ($X_B$) of $O_2$ in air. The time to react to an indicated percent of remaining reactant concentration (Ca) is plotted for five concentrations ($X_B$) of oxygen in air, as indicated in the legend where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79% N2), 120% ($O_2$=25% and $N_2$=75%), 160% ($O_2$=33% and $N_2$=67% N2), and 200% ($O_2$=42% and $N_2$=58%) as indicated in the legend.
Figure 12:
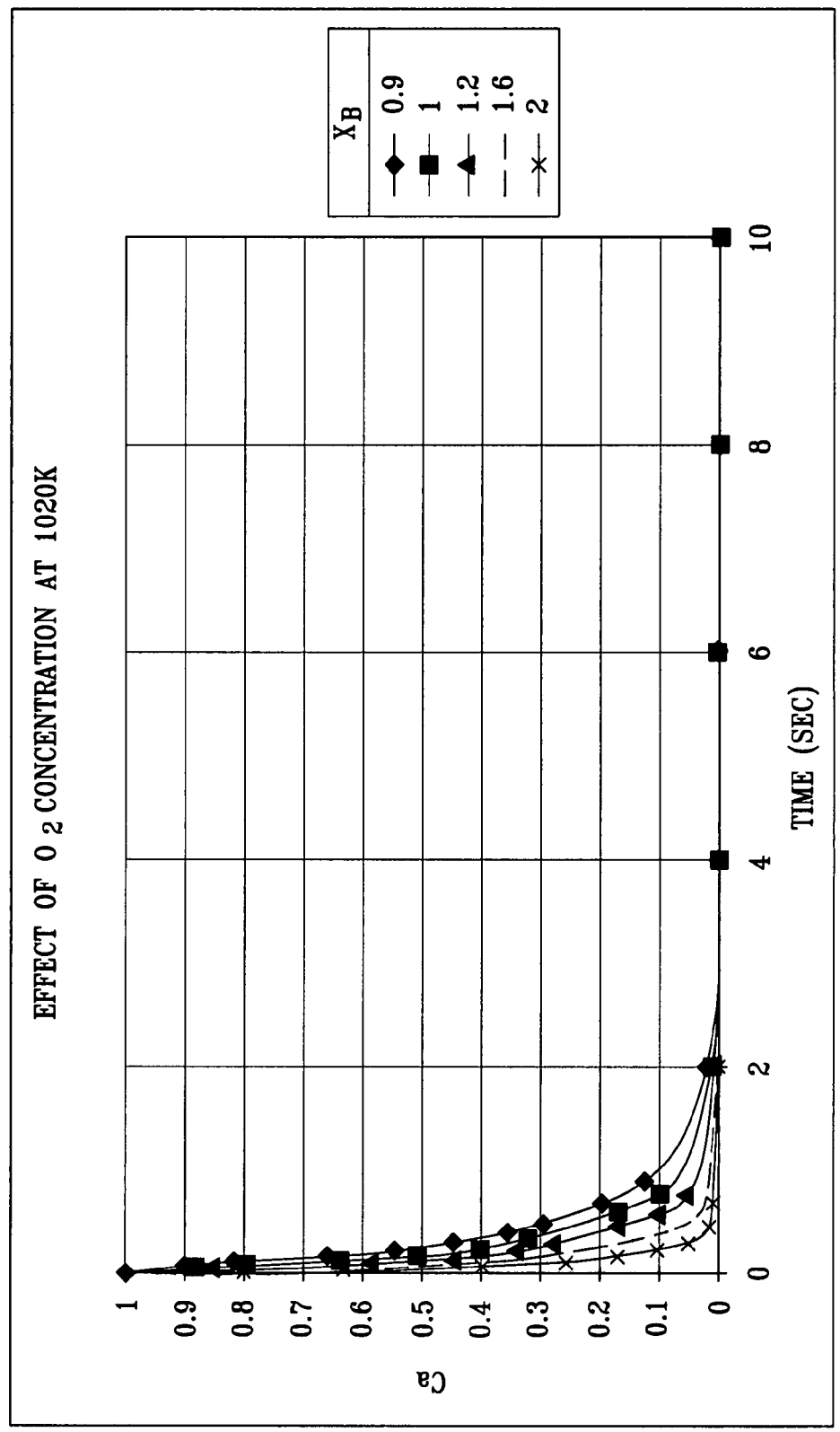
FIG. 12 is a graph of a modeled reaction at a constant temperature of 1020° K and showing the time for reacting all the reactants of the fuel in terms of concentration Ca of a reacting gas. The modeled results are plotted for each of five different starting concentrations ($X_B$) of $O_2$ in air. The time to react to an indicated percent of remaining reactant concentration (Ca) is plotted for five concentrations ($X_B$) of oxygen in air, as indicated in the legend where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79% $N_2$), 120% ($O_2$=25% and $N_2$=75%), 160% ($O_2$=33% and $N_2$=67% N2), and 200% ($O_2$=42% and $N_2$=58%) as indicated in the legend.

Basically, the same relationship of shorter time of conversion as a result of higher concentration of $O_2$ is demonstrated by all of the Graphs in FIGS. 8-12. These graphical representations show modeled reactions at five different constant temperatures (one temperature indicated for each graph). FIG. 8 shows a constant 980° K, FIG. 9 shows a constant 990° K, FIG. 10 shows a constant 1000° K, FIG. 11 shows a constant 1010° K, and FIG. 12 shows a constant 1020° K. For each temperature of reaction, the time for reacting the temperature is plotted versus the percentage of completion of the fuel conversion Ca. At time=0, the level of completion is 0 as the amount of fuel remaining is 100% so that Ca=1.0. The modeled results are plotted for each of five different starting concentrations ($X_B$) of $O_2$ in air, namely starting concentration ($X_B$) of oxygen in air where the smallest concentration $X_B$ is 90% of normal concentration and the largest concentration $X_B$ is 200% of normal concentration as follows for each of the five cases modeled: $X_B$=90% ($O_2$=18% and $N_2$=82%), $X_B$=100% ($O_2$=21% and $N_2$=79%), $X_B$=120% ($O_2$=25% and $N_2$=75%), $X_B$=160% ($O_2$=33% and $N_2$=67%), and $X_B$=200% ($O_2$=42% and $N_2$=58%) as indicated in the legend. This shows the theoretical effect of the increases in the concentration of oxygen in the intake air for a given engine, and is provided here for illustrative purposes only and should not be construed as limiting the invention to any one of the representative examples.

FIG. 8 is a graph of a modeled reaction at a constant temperature of 980° K and showing the time for reacting all of the $O_2$ from the starting concentration indicated as 1.0 to complete combustion indicated as 0 remaining $O_2$. The modeled results are plotted for each of five different starting concentrations ($X_B$) of $O_2$ in air, namely starting concentration ($X_B$) of oxygen in air where the smallest concentration Ca is 90% of normal concentration and the largest concentration $X_B$ is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend.

FIG. 9 is a graph of a modeled reaction at a constant temperature of 990° K and showing the time for reacting all of the $O_2$ from the starting concentration indicated as 1.0 to complete combustion indicated as 0 remaining $O_2$. The modeled results are plotted for each of five different starting concentrations ($X_B$) of $O_2$ in air, namely starting concentration ($X_B$) of oxygen in air where the smallest concentration Ca is 90% of normal concentration and the largest concentration $X_B$ is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend.

FIG. 10 is a graph of a modeled reaction at a constant temperature of 1000° K and showing the time for reacting all of the $O_2$ from the starting concentration indicated as 1.0 to complete combustion indicated as 0 remaining $O_2$. The modeled results are plotted for each of five different starting concentrations ($X_B$) of $O_2$ in air, namely starting concentration ($X_B$) of oxygen in air where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend.

FIG. 11 is a graph of a modeled reaction at a constant temperature of 1010° K and showing the time for reacting all of the $O_2$ from the starting concentration indicated as 1.0 to complete combustion indicated as 0 remaining $O_2$. The modeled results are plotted for each of five different starting concentrations ($X_B$) of $O_2$ in air, namely starting concentration ($X_B$) of oxygen in air where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend.

FIG. 12 is a graph of a modeled reaction at a constant temperature of 1020° K and showing the time for reacting all of the $O_2$ from the starting concentration indicated as 1.0 to complete combustion indicated as 0 remaining $O_2$. The modeled results are plotted for each of five different starting concentrations ($X_B$) of $O_2$ in air, namely starting concentration ($X_B$) of oxygen in air where the smallest concentration $X_B$ is 90% of normal concentration and the largest concentration $X_B$ is 200% of normal concentration as follows for each of the five cases modeled: 90% ($O_2$=18% and $N_2$=82%), 100% ($O_2$=21% and $N_2$=79%), 120% ($O_2$=25% and $N_2$=75%), 160% ($O_2$=33% and $N_2$=67%), and 200% ($O_2$=42% and $N_2$=58%) as indicated in the legend.

Thus, there has been disclosed a method and a device for reducing air pollutants from an internal combustion engine of the type designed for providing a given power output based upon the combustion of hydrocarbon fuel in the air. The method includes providing an oxygen-enriched intake air stream to an internal combustion engine, maintaining the output power at the given power output according to the design of the engine, and combusting the oxygen enriched air with fuel in the engine at a temperature lower than the normal combustion temperature for the engine when burning air having ambient oxygen content so that a rate of fuel energy conversion results due to the oxygen enriched air at the lower temperature that is essentially the same rate of fuel energy conversion as would normally result from combusting the fuel with air having ambient oxygen content. By this method, the amount of thermal $NO_x$ produced in exhaust gas from the engine is reduced due to the lower combustion temperature, relative to the engine operating at a higher temperature without enhanced oxygen content in the air.

In one embodiment of a NOx reduction method and device, the oxygen-enriched intake air comprises a mixture of nitrogen and oxygen and the oxygen concentration in the intake air is increased to about 25% oxygen.

In one or more other embodiments of a method or a device for reducing NOx in an internal combustion engine, the oxygen-enriched air stream is provided by one or more methods or devices of oxygen-air stream enrichment selected from the group of oxygen enrichment methods and devices including supplying compressed oxygen into the engine air intake as by a compressed oxygen tank, separating oxygen from the air using a molecular membrane and supplying enriched oxygen intake air into the engine, as by molecular membrane separation of enriched oxygen air from enriched nitrogen air, supplying enriched oxygen intake air into the engine by separating oxygen and nitrogen gases using a gas separation membrane, supplying enriched oxygen intake air into the engine by separating oxygen and nitrogen gases using a molecular sieve, supplying enriched oxygen intake air into the engine by separating oxygen and nitrogen by using a filter, supplying enriched oxygen intake air into the engine by separating oxygen and nitrogen by using a gas absorption separator, supplying enriched oxygen intake air into the engine by separating oxygen and nitrogen by using a pressure swing separator, and supplying enriched oxygen intake air into the engine by separating oxygen and nitrogen by gases using any combinations of the variously described methods and devices.

In one embodiment, a method of improving fuel efficiency in a combustion engine is disclosed including adapting an oxygen-enriching apparatus to a combustion engine, providing an air stream from the oxygen-enriching apparatus to the combustion engine intake, and combusting fuel with the oxygen-enriched air.

In one embodiment, an apparatus for reducing air pollutants from combustion engines includes a first end, a second end, and a middle portion, wherein the first end includes a connector capable of being adapted to the intake of a combustion engine, the second end includes an interface exposed to an air source, and the middle portion communicates air from the second end to the first end and includes an oxygen enhancer, such that the air communicated from the air source to the engine has an enhanced oxygen content so that the operating temperature for obtaining a given power output is lower than the operating temperature without an enhanced oxygen content of the intake air.

In one or more embodiments, an apparatus for reducing air pollutants from combustion engines includes a first end, a second end, and a middle portion, wherein the first end includes a connector capable of being adapted to the intake of a combustion engine, the second end includes an interface exposed to an air source, and the middle portion communicates air from the second end to the first end and includes an oxygen enhancer, wherein the oxygen enhancer of the middle portion further includes one or more oxygen enhancement mechanisms selected from a molecular membrane, a gas separation membrane, a molecular sieve, a filter, a gas absorption separator, a pressure swing separator, and any combinations thereof.

In one embodiment, an apparatus for reducing air pollutants from combustion engines includes a first end, a second end, and a middle portion, wherein the first end includes a connector capable of being adapted to the intake of a combustion engine, the second end includes an interface exposed to an air source, and the middle portion communicates air from the second end to the first end and includes an oxygen enhancer, wherein the air source is comprised of compressed oxygen.

One embodiment of a method for reducing $NO_x$ produced in the exhaust from an internal combustion engine, upon the combustion of a given quantity of hydrocarbon fuel in the air to provide an engine designed output power, includes enriching the oxygen in the intake air to an internal combustion engine, maintaining the given quantity of hydrocarbon fuel and output power at the designed output power for the engine, and combusting the oxygen enriched air with fuel in the engine at a lower temperature than the normal combustion temperature for the engine when burning air having ambient oxygen content, wherein the lower temperature comprises a temperature defined by the equation:

$$Ae^{-E/RTs}X_{As}X_B = \Delta C_A/\Delta t = Ae^{-E/RTe}X_{Ae}X_B$$

where:
A=the activation constant for the combustion reaction;
e=is the exponential value;
E=is the energy constant for the combustion reaction;
R=is the rate constant for the combustion reaction;
Ts=is the standard average combustion temperature at which the engine is designed to burn the fuel to produce the expected output power;
$X_{As}$=is the concentration of oxidants in the air to be combusted;
$\Delta C_A/\Delta t$=is the rate of conversion of fuel and oxidants to exhaust gases;
Te=is the lower temperature of the combustion to have the same rate of conversion of fuel and oxidants when the concentration of oxidants is increased;
$X_{Ae}$=is the increased concentration of oxidants
so that a rate of fuel energy conversion results due to the oxygen enriched air at the lower temperature that is essentially the same rate of fuel energy conversion as would normally result from combusting the fuel with air having ambient oxygen content, wherein the amount of thermal $NO_x$ produced in exhaust gas from the engine is reduced due to the lower combustion temperature.

While the invention has been described with respect to a limited number of embodiments, and the discussion has focused on motor vehicle combustion engines, those skilled in the art, having benefit of this disclosure, will appreciate that other embodiments can be devised which do not depart from the scope of the invention as disclosed herein. For example, ship engines that burn fossil fuels may also benefit from the present invention. Accordingly, the scope of the invention should be limited only by the attached claims.

What is claimed is:

1. An apparatus for reducing NOx exhausted from combustion engines comprising:
a first end, a second end, and a middle portion, wherein
the first end comprises a connector capable of being adapted to an intake of a combustion engine;
the second end comprises an interface exposed to an air source;
the middle portion communicating air from the second end to the first end and comprising an oxygen enhancer, such that the air communicated from the air source to the combustion chamber of the engine has enhanced oxygen content;
a controller coupled with the middle portion for regulating the air flow with enhanced oxygen content and a quantity of fuel for maintaining a designed output power of the engine based upon combusting the fuel in the engine with air having ambient air concentration of oxygen so that the output power from the engine upon combustion of the fuel with oxygen enriched air is the same power as would be produced by combusting the fuel in air with ambient oxygen concentration; and
a fuel supply to supply the quantity of fuel to produce the designed engine power output according to the controller.

2. The apparatus of claim 1, wherein
the oxygen enhancer of the middle portion further comprises one or more oxygen enhancement mechanisms selected from a molecular membrane, a gas separation membrane, a molecular sieve, a filter, a gas absorption separator, a pressure swing separator, and any combinations thereof.

3. The apparatus of claim 1, wherein
the oxygen enhancer comprises a compressed $O_2$ supply.

* * * * *